United States Patent [19]

Zhang

[11] Patent Number: 5,075,401

[45] Date of Patent: Dec. 24, 1991

[54] METHOD OF MAKING GRAFT COPOLYMERS

[75] Inventor: Lian-Sheng Zhang, Harbin, China

[73] Assignee: Allied Colloids Ltd., England

[21] Appl. No.: 399,323

[22] Filed: Aug. 25, 1989

[30] Foreign Application Priority Data

Aug. 26, 1988 [GB] United Kingdom ............... 8820332

[51] Int. Cl.$^5$ .................. C08H 1/00; C08H 5/02
[52] U.S. Cl. .................... 527/201; 527/202;
527/207; 527/300; 527/311; 527/312; 527/313;
527/314; 527/315; 525/59; 525/246
[58] Field of Search ............ 527/300, 311, 312, 313,
527/314, 315, 201, 202, 207; 525/59, 246

[56] References Cited

U.S. PATENT DOCUMENTS 4,131,576 12/1978 Iovine et al. .................. 527/314

OTHER PUBLICATIONS

Bains "Inorganic Redox Systems in Graft Polymerization Onto Cellulosic Materials", J. Polymer Sci.: Part C, No. 37, pp. 125–151 (1972).

Primary Examiner—Nathan M. Nutter
Attorney, Agent, or Firm—Ostrolenk, Faber, Gerb & Soffen

[57] ABSTRACT

A graft copolymer is made by grafting, by a free radical reaction mechanism in aqueous solution, water soluble ethylenically unsaturated monomeric material on to a water soluble substrate having hydroxyl groups, and the free radicals are formed on the substrate using an oxidizing metal capable of being reduced by the substrate to a lower valency state (for instance cerium) and persulphate or other peroxy compound capable of oxidizing the metal back to a higher valency state. The process is preferably conducted as a reverse phase polymerization process and the invention includes also a novel reverse phase emulsion comprising a dispersion of reverse phase polymer particles of a graft copolymer of carboxymethyl cellulose, dextran or starch with acrylamide and acrylic acid and/or AMPS.

14 Claims, No Drawings

METHOD OF MAKING GRAFT COPOLYMERS

There have been many proposals to form graft copolymers between ethylenically unsaturated monomers (for instance acrylamide and/or acrylic acid) and polymers containing hydroxyl groups (for instance starch, carboxymethyl cellulose or dextran). Unfortunately it has been difficult to obtain high degrees of grafting and the products tend to have a relatively low amount of grafting (with much of the monomer polymerising with itself rather than on to the polymer backbone) and/or have a relatively low molecular weight.

Free radical initiating mechanisms that have been proposed include peroxy systems, for instance using peroxide or persulphate, and reducible metal systems, for instance using ceric ion. The relative merits of these are discussed by Takahashi et al. in Kogakuin Daigaku Kenkyu Hokoku (Kogakuin University Research Bulletin) No. 43, Nov. 1977 pages 232 to 237. This shows that, when polymerising acrylamide in the presence of carboxymethyl cellulose, the conversion using ceric initiator is much less than the conversion using ammonium persulphate initiator, but it also indicates that about half the monomer had polymerised with itself, rather than being graft polymerised on to the cellulose. It also speculates that the low conversion using ceric was caused by colloidal precipitation as a result of the carboxymethyl cellulose forming acid groups that then react with ceric to form a salt.

The general situation is that peroxy initiators can be used with a wide range of monomers and polymers but do suffer from the disadvantage that they tend to promote homo or copolymerisation in preference to graft polymerisation with the result that a large proportion of the final polymeric product is not graft polymer. Metal ion initiators will, potentially, give graft polymerisation in preference to homo or copolymerisation but suffer from the disadvantage that they are deactivated by, and may precipitate, polymers such as carboxymethyl cellulose and monomers such as acrylic acid.

In a series of articles, McCormick et al. have analysed these problems and described various ways of trying to avoid them. For instance in Chemical Abstracts Volume 100 68840N McCormick proposes oxidative modification of the dextran substrate before using ceric as initiator. In CA 100 175661B McCormick stated that, when using ceric initiator, it was more effective to graft polymerise acrylamide and then hydrolyse it to acrylate than to try to graft polymerise acrylate. In CA 102 114094 McCormick recommended the graft polymerisation of acrylamide and diacetone acrylamide rather than acrylamide alone.

There are numerous proposals in the literature for graft polymerisation of various monomers on to various polymers but, in reality, they all tend to suffer from these limitations.

It is also known to induce graft polymerisation by other mechanisms, for instance irradiation. However these are inconvenient and difficult to control.

Graft polymerisation is normally conducted in bulk aqueous solutions but it is known to graft on to polysaccharides by reverse phase bead processes in U.S. Pat. No. 4,131,576 and by reverse phase emulsion processes in EP 216091. In each of these the polysaccharide is described as being a starch, starch conversion product, plant gum, starch ether, starch ester or unspecified cellulose or cellulose derivative and in practice the examples always use starch. Initiation is, in the examples, always by persulphate.

The process limitations have resulted in graft polymers formed from carboxymethyl cellulose and/or carboxylic-containing monomers necessarily having a relatively low degree of grafting and/or a relatively low molecular weight and/or a rather high proportion of homopolymer or copolymer, as opposed to graft polymer. The same problems also tend to arise with various other hydroxyl-containing polymeric substrates. The resultant limitations on the chemical types of graft polymers that are conveniently available is undesirable since it greatly restricts the materials that are available for use as, for instance, downhole additives, even though optimum graft copolymers of, for instance, carboxymethyl cellulose and acrylic acid ought to be very useful for such purposes.

There is therefore a need for a new process of graft polymerisation that is not subject to the restrictions of known processes and that, in particular, can lead to polymers of improved properties and characteristics.

According to a first aspect of the invention a graft copolymer is made by grafting, by a free radical reaction mechanism in aqueous solution, water-soluble ethylenically unsaturated monomeric material onto a water soluble substrate having hydroxyl groups, characterised in that the free radicals are formed on the substrate using both an oxidising metal capable of being reduced by the substrate to a lower valency state and a peroxy compound capable of oxidising the metal in the reduced valency state to a higher valency state. The substrate is usually a polymer.

It seems that the mechanism probably involves the initial step of reaction between a hydroxy-substituted carbon atom in the polymer (or other substrate) and the oxidising metal ion to form an ionic complex at that carbon atom of the free radical, a hydrogen ion and the reduced metal ion, and that this complex is then oxidised by the peroxy compound to form a free radical on the carbon atom of the polymeric compound with liberation of the original oxidising metal ion.

Thus the polymer or other substrate can be regarded as the reducing part of the redox couple that is utilised for forming the free radicals and, in particular, the free radicals are formed preferentially on the polymer. The preferential place for polymerisation therefore is at the position of these free radicals, on the carbon atoms of the polymer that were initially substituted by hydroxyl groups, and thus graft polymerisation on to the polymer backbone is the preferred reaction, in contrast to the homopolymerisation and copolymerisation that occurs if the peroxy compound is used by itself, i.e., without the oxidising metal.

As well as having the advantage of giving a very high proportion of graft polymer, and a very low proportion, and often substantially zero, homopolymerisation or copolymerisation, the invention also has the advantage that it is possible to obtain very high degrees of polymerisation within the graft chains (provided the polymerisation system is free of compounds such as chain transfer agents that would depress molecular weight). Thus the invention permits, for the first time, the production of very high molecular weight graft copolymers. Additionally, since the oxidising metal can be regarded primarily as a type of catalyst for the formation of free radicals, rather than as a conventional producer of free radicals, it is possible to achieve the desired results with very low amounts of oxidising metal and so the precipitation problems traditionally associated with polymers such as carboxymethyl cellulose and monomers such as acrylic acid can be avoided.

The substrate that can be used as the backbone can be any water soluble polymer that has carbon atoms that can provide free radicals by the combination of metal ion and peroxy compound. The alcohol groups should therefore be primary or secondary alcohol groups and preferably they are vic-glycols. The polymers are usually polysaccharides or other carbohydrates and so may be materials such as starch or starch derivatives, cellulose or cellulose derivatives, dextran or dextrin. Particularly preferred are carboxymethyl cellulose, starch and dextran. Synthetic hydroxy-substituted polymers can be used, for instance polyvinyl alcohol.

In a modification, low molecular weight materials such as sugar alcohols, e.g., sorbitol, or even glycerol can be used as the vic-glycol or other substrate that can be used as the source of free radicals.

In order to initiate the free radical reaction, any higher valency metal ion capable of oxidising the polymeric backbone to form a free radical which complexes with the metal ion in a lower oxidation state is suitable. Examples are ions of chromium, vanadium, titanium, manganese and especially cerium (4+).

The oxidising peroxy compound used to displace the metal ion may be any effective persalt or peroxide, for instance perphosphate, perborate and persulphate, persulphate being particularly preferred.

A variety of water soluble ethylenically unsaturated monomers, or water soluble blends of ethylenically unsaturated monomers, may be graft polymerised on to the backbone. They may be anionic, non-ionic or cationic. Examples of anionic monomers are ethylenically unsaturated carboxylic monomers such as acrylic acid or methacrylic acid (for instance in the form of a water soluble salt such as sodium or ammonium acrylate) and ethylenically unsaturated sulphonic monomers such as allyl sulphonate or, preferably, 2-acrylamido methyl propane sulphonate.

Suitable non-ionic monomers include materials such as lower hydroxy alkyl (meth) acrylates but the preferred non-ionic monomer is acrylamide.

Suitable cationic monomers include dialkylaminoalkyl (meth) -acrylates and -acrylamides (as free base, acid addition or quaternary ammonium salts) and monomers such as diallyl dimethyl ammonium chloride.

Although the invention can be used when the monomer does not have any tendency to precipitate with the ceric ion, for instance acrylamide, the invention is of particular value when the monomers or the substrate include anionic material since this would normally have been expected to precipitate in the presence of ceric ion. Thus the process is of particular value with monomers such as acrylic or other unsaturated carboxylic acid (or a water soluble salt), and preferred processes of the invention are those that are conducted using carboxymethyl cellulose as the substrate and/or acrylic acid as part or all of the monomer that is to be graft polymerised on to the substrate.

Since it is possible and desirable to obtain very high molecular weights it is desirable for the amount of substrate to be relatively low compared to the amount of monomer. For instance the amount of carboxymethyl cellulose or other substrate is often below 20% by weight of the mixture of substrate and monomers, and is often below 15%. Preferred products use 2 to 10% of the CMC, starch, dextran or other substrate with 90 to 98% by weight monomer.

When, as is preferred, the monomers are a blend of acrylamide and anionic monomer, it is often preferred that the weight ratio of acrylamide to other monomer is in the range 40:60 to 80:20, often 45:55 to 75:25. Particularly preferred polymers are formed from 2 to 10% of the polymer backbone, 48 to 75% by weight acrylamide and 15 to 50% by weight ammonium acrylate or other water soluble acrylate and/or 2-acrylamido-2-methyl propane sulphonate.

Suitable amounts of polyvalent metal ion and peroxy compound can easily be found by routine experimentation. With some monomers and polymers (e.g., carboxymethyl cellulose and acrylic acid) it is desirable to keep the amount of metal ion sufficiently low to avoid any risk of the formation of a water insoluble precipitate but with others (e.g., starch and acrylamide) the amount of polyvalent metal ion is not very critical, provided that there is enough present in the system to cause the desired reaction. In these systems, the amount of polyvalent metal ion can be approximately the same as has conventionally been used when it has been the sole source of free radicals. The amount of peroxy compound likewise can be approximately the same as would normally have been used alone in prior processes.

Since the reactants are all water-soluble, polymerisation may be carried out in any of the standard aqueous polymerisation techniques such as bulk gel polymerisation or reverse phase bead polymerisation. Reverse phase emulsion polymerisation is particularly preferred, especially because it facilitates the formation of very high molecular weight materials. The reverse phase emulsion can be polymerised by emulsion kinetics (in the presence of a relatively large amount of emulsifier) or by suspension polymerisation kinetics.

The concentration of graft copolymer (and thus of starting polymer and monomers) in the aqueous phase is generally at least 15% and usually at least 25%. It can be as high as, for instance, 60% but is often below 50% by weight.

This aqueous phase is present as a dispersion in a non-aqueous liquid, the amount of non-aqueous liquid generally being at least 15% and usually below 50%, often below 35%, by weight based on the total weight of non-aqueous and aqueous phases.

In order to promote the formation of an emulsion having a small particle size (typically below 3 μm) a conventional water-in-oil emulsifying agent may be used, typically in an amount of 0.1 to 15% by weight based on the weight of the emulsion. Preferably the amount is below 5% and often below 3%.

A polymeric stabiliser may be included to promote stability of the emulsion, suitable stabilisers generally being amphipathic polymers.

Any of the materials and methods conventional in reverse phase polymerisation may be used in the invention and such materials are described in, for instance, EP 126528. However it is also possible to carry out the process using large amounts of surfactant, for instance as described in U.S. Pat. No. 3,284,393. Other relevant disclosures are in U.S. Pat. Nos. 4,435,528, 4,439,332 and EP 119078.

Homogenisation of the emulsion is effected by subjecting the mixture to high shear mixing techniques which are well known.

The homogenised emulsion is generally deoxygenated and the metal ion and peroxy compound may then be added as an initiator solution which is injected into the reaction mixture in order to initiate polymerisation.

Since the peroxy compound is intended to oxidise the complex formed between the metal compound and the polymer, it can be convenient in some instances to premix the metal compound and the polymer, and to add the peroxy compound subsequently.

Polymerisation typically is conducted at a temperature of 30° to 45° C. and is allowed to proceed for as long as is required to achieve the desired molecular weight, often in the range 6 to 20 hours. The mixture can be stirred continuously or occasionally during the process. The polymerisation can be terminated when desired by adding a polymerisation inhibitor such as hydroquinone.

The resultant emulsion of aqueous polymer particles in non-aqueous liquid can be dehydrated by azeotroping, for instance as described in EP 126528 to form an emulsion of substantially dry polymer particles dispersed in the non-aqueous liquid.

In order to use the polymer particles, for instance downhole, it is necessary to put them into aqueous solution and the emulsion can be inverted into water in conventional manner. An oil-in-water inverting surfactant of known type can be included in the water or, preferably, in the emulsion in known manner.

Typical non-aqueous liquids include aliphatic, aromatic or naphthenic hydrocarbon solvent or oils, chlorinated hydrocarbons and aromatic or higher alaphatic esters such as fatty glycerides, dibutyl phthalate and di-octyl phthalate. Mixtures may be used. The liquids are inert, non-solvents for the water-soluble polymers.

Inverting surfactants which may be used include for example ethoxylated octyl or nonyl phenol.

Oil-soluble, water-in-oil surfactants which may be used typically having HLB values of from 1 to 10, preferably from 2 to 6 and include for example sorbitan monosterate, sorbitan monooleate, glyceryl monooleate and ethyoxyleated fatty alcohols.

According to a second aspect of the invention, a reverse phase suspension or, preferably, emulsion (which may be aqueous or dehydrated) comprises, as the dispersed phase, a graft copolymer of carboxymethyl cellulose, dextran or starch with one or more ethylenically unsaturated monomers. Preferably this emulsion is made from the materials described above and by the initiating system and general techniques described above.

According to a third aspect of the invention, a new graft polymer is formed between a hydroxyl-containing polymer on to which are grafted one or more ethylenically unsaturated monomers wherein the great majority of the monomers (typically at least 80% and often at least 90%) are present as graft copolymer, and having high molecular weight, generally above 1 million. The substrate polymer is preferably carboxymethyl cellulose and the monomer preferably comprises acrylic acid.

The polymers are of particular value as fluid loss additives, since they can have a very good combination of molecular bulk, solubility and molecular weight.

In the following examples, the intrinsic viscosities of all polymer solutions were determined at 30° C. using a Ubelohde viscometer in aqueous solution of 1.0M $NaNO_3$.

Molecular weights of copolymers were obtained by calculating from the equation:

$$[n] = 3.73 \times 10 - 3M\ 0.66$$

The copolymers produced were tested for applicability to oil recovery and samples were subjected to the following tests.
(1) Activation tests in API Freshwater and Seawater.
(2) Filterability in the same brines.
(3) Brookfield UL solution viscosity versus active concentration in the same brines.

EXAMPLE 1

The oil phase was prepared by dissolving 4.2 g of sorbitan monooleate, Tergitol type surfactants 2.2. g with H.L.B. value of 4.5 and 3.3. g with H.L.B. value of 12.2. in 80 ml of ISOPAR-M. The oil phase was stirred at high speed in a suitable reaction vessel equipped with gas inlet, outlet tubes, and was sparged with nitrogen gas to removed oxygen from the system. In turn to the reaction vessel were added 200 ml 3% aqueous solution of CMC mixed with 1 ml 0.01M of ceric ammonium nitrate in 0.1M nitric acid; a monomer solution have pH of 6.8 containing 53 g of recrystallized and vacuum dried acrylamide, 30.8 g of 65% of aqueous solution of ammonium acrylate, 5 ml of 5.6% aqueous solution of EDTA and some ammonium hydroxide; 1.8 ml 0.1M of aqueous solution of potassium persulphate, yielding a water-in-oil emulsion. The emulsion was further homogenized by passage through an homogenizer. The resultant emulsion which has a viscosity of 550 centipoises and a dispersed phase particle size of about 2.5 microns or less, was placed in a constant temperature bath held at 40° C. and allowed to react for 6 hours. The emulsion was stirred for ten minutes every hour until the reaction was completed. In the last, 2.0 ml of deionized water saturated with hydroquinone (about 80 parts per million based on monomers) were added to terminate the reaction.

Dropwise addition of 100 ml of acetone to a 15.0 g sample of the resultant graft copolymer emulsion precipitated the copolymer, after which the copolymer was vacuum dried at 50° C. in a vacuum oven. The yielding powder of copolymer was about 3.1 g, the solid content of the emulsion is 20.66%, the conversion of AM and NH4-AA is about 95%. The intrinsic viscosity is 11.8, the molecular weight is $6.6 \times 10^6$.

EXAMPLES 3-11

In a series of syntheses following the procedures of Example ten graft copolymers were made with different amounts of CMC-backbone and varying ratios of acrylamide/ammonium acrylate at same reaction conditions to produce graft copolymers with a range of molecular weights and a range of the number of grafted units of acrylamide on the CMC macromolecule. The reaction components and the results were shown in Table I.

| Example Number | CMC-added Moles $\times 10^{-2}$ | Acrylamide/ Ammonium Acrylate Mole ratio | Dp | Ng | [n] | Mn $\times 10^6$ | API in F.W. 5000 ppm |
|---|---|---|---|---|---|---|---|
| 1 | 0.415 | 0.70:0.30 | 1600 | 17.7 | 9.1 | 4.4 | 1024 |

-continued

| Example Number | CMC-added Moles × 10⁻² | Acrylamide/ Ammonium Acrylate Mole ratio | Dp | Ng | [n] | Mn × 10⁶ | API in F.W. 5000 ppm |
| --- | --- | --- | --- | --- | --- | --- | --- |
| 2  | 0.826 | 0.70:0.30 | 1780  | 11.6 | 9.5  | 4.5 | 1760 |
| 3  | 1.24  | 0.70:0.30 | 1970  | 8.7  | 11   | 5.9 | 1890 |
| 4  | 1.64  | 0.70:0.30 | 2200  | 6.6  | 11.5 | 6.2 | 1900 |
| 5  | 2.06  | 0.75:0.25 | 2400  | 5.2  | 13.1 | 7.4 | 1500 |
| 6  | 2.47  | 0.75:0.25 | 2600  | 4.8  | 13   | 7.1 | 1400 |
| 7  | 2.47  | 0.75:0.25 | 14700 | 3.3  | 13.3 | 7.6 | 2260 |
| 8  | 2.47  | 0.70:0.30 | 14700 | 3.3  | 12.9 | 6.6 | 1760 |
| 9  | 2.48  | 0.70:0.30 | 14700 | 3.1  | 13.3 | 7.7 | 2250 |
| 10 | 2.48  | 0.80:0.20 | 14700 | 3.1  | 11.5 | 6.2 | 1980 |
| 11 | 2.48  | 0.90:0.10 | 14700 | 3.1  | 10.6 | 5.3 | 1700 |

Dp = degree of polymerisation
Ng = average no. of chains of acrylamide & ammonium acrylate added to each CMC molecule.
[n] = intrinsic viscosity of copolymers The results set forth in Table 1 are all derived from standarized procedures, based on solutions of CMC in 1 molar sodium nitrate brine. The intrinsic viscosities of all copolymers solutions were determined at 30° C. using a Ubbelohde viscometer in the same brine. It will be seen from the data in Table 1 that as the number of grafts per CMC molecule (Ng) increases, the maximum obtainable value of the number of monomers units in each graft (Dp) decreases, and as the amount of ammonium acrylate added increases from mole ratio of 0.1 to about 0.35, the instrinsic viscosities of the graft copolymers are increased.

These results show that the graft copolymers have higher intrinsic viscosities at all molecular weights than indicating that the CMC backbone sharply increases the capacity of the copolymer to viscosify water.

The results of activation test in API fresh water showed the graft copolymers are effective viscosifiers. The intrinsic viscosities of copolymers with less than 11.5 grafts per CMC-backbone molecule are 2 to 4 times higher than an equal molecular weight acrylamide and acrylate copolymer, indicating that the polymeric backbone sharply increases the capacity of the graft copolymer to viscosify water.

EXAMPLE 12

This example illustrates the preparation of the emulsion of starch graft copolymer. The oil phase was prepared following the procedure of Example 2. The aqueous phase was prepared by dissolving 6.0 g water-soluble starch in 200 ml of deionized hot water. The solution cooled and mixed with 1 m. 0.01M of ceric ammonium nitrate in 0.1M nitric acid, 53.35 g of recrystallized and vacuum dried acrylamide, 30.8 g of 65% aqueous solution of ammonium acrylate, 5 ml of 5.6% aqueous solution of EDTA, a few drops of conc. ammonium hydroxide (29.1%) and 1.8 ml 0.1M of aqueous solution of potassium persulphate, yielding a water-in-oil emulsion. The emulsion was further homogenized by passage through an homogenizer. The resultant emulsion which has a viscosity of 550 centipoises and a dispersed phase particle size of about 2.5 microns or less, was placed in a constant temperature bath held at 40° C. and allowed to react for 6 hours. The emulsion was stirred for ten minutes every hour until the reaction was completed, when 2.0 ml of deionized water saturated with hydroquinone (about 80 parts per million based on monomers) were added to terminate the reaction. Dropwise addition of 100 ml of acetone to a weighed sample of about 15.0 g of the resultant graft copolymer emulsion precipitated the copolymer, after which the copolymer was vacuum dried at 50° C. in a vacuum oven. The yield of copolymer powder was about 3.4 g, the solid content of the emulsion is 22.6%, the conversion of acrylamide and ammonium acrylate is about 98%. The intrinsic viscosity is 10.2, the molecular weight is $5.35 \times 10^6$.

EXAMPLE 13

This example illustrates the preparation of the emulsion of dextran graft copolymer. The oil phase was prepared following the procedure of Example 2. The aqueous phase was prepared by dissolving 6.0 g dextran which is the industrial grade with 5,000,000–40,000,000 average Mol. Wt. in 200 ml of hot deionized water. The solution is cooled and mixed with 1 ml of 0.01M of ceric ammonium nitrate in 0.1M nitric acid, 53.35 g of recrystallized and vacuum dried acrylamide 30.8 g of 65% aqueous solution of ammonium acrylate, 5 ml of 5.6% aqueous solution of EDTA, a few drops of conc. ammonium hydroxide (29.1%) and 1.8 ml 0.1M of aqueous solution of potassium persulphate, yielding a water-in-oil emulsion. The emulsion was further homogenized by passage through an homogenizer. The resultant emulsion which has a viscosity of 550 centipoises and a dispersed phase particle size of about 2.5 microns or less, was placed in a constant temperature bath held at 40° C. and allowed to react for 12 hours. The emulsion was stirred for ten minutes every hour until the reaction was completed, when 2.0 ml of deionized water saturated with hydroquinone (about 80 parts per million based on monomers) were added to terminate the reaction. Dropwise addition of 100 ml of acetone to a weighed sample of about 15.0 g of the resultant graft copolymer emulsion precipitated the copolymer, after which the copolymer was vacuum dried at 50° C. in a vacuum oven. The yield of copolymer powder was about 3.2 g, the solid content of the emulsion is 21.3%, the conversion of acrylamide and ammonium acrylate is about 98%. The intrinsic viscosity is 10.2, the molecular weight is $5.35 \times 10^6$.

EXAMPLE 14

This example illustrates the preparation of the emulsion of CMC-acrylamide-ammonium acrylate graft copolymer. The oil phase was prepared following the procedures of Examples 1 and 2. The aqueous phase was prepared by dissolving 6.0 g industrial grade CMC with average molecular weight 250,000–400,000 in 200 ml of hot deionized water. The solution was cooled and mixed with 1 ml of 0.01M of ceric ammonium nitrate in 0.1M nitric acid, 53.35 g of recrystallized and vacuum dried AM, 50 ml of aqueous solution of ammonium-2-acrylamide-2-methylpropane sulfonate prepared by neutralizing 19.1 g (about 0.1M) of 2-acrylamido-2-methyl-1-propanesulfonic acid (content 99%), with 12.1 ml of 20.1% conc. ammonium hydroxide mixed with 38 ml of deionized water to pH in the range from about 6.8 to 7.5, 5 ml of 5.6% aqueous solution of EDTA, a few drops of conc. ammonium hydroxide (29.1%) and 1.8 ml 0.1M of aqueous solution of potassium persulphate, yielding a water-in-oil emulsion. The emulsion was further homogenized by passage through an homogenizer. The resultant emulsion which has a viscosity of 550 centipoises and a dispersed phase particle size of about 2.5 microns or less, was placed in a constant temperature bath held at 45° C. and allowed to react for 12 hours. The emulsion was stirred for ten minutes every hour until the reaction was completed, when 2.0 ml of deionized water saturated with hydroquinone (about 80 parts per million based on monomers) were added to terminate the reaction.

Dropwise addition of 100 ml of acetone to a weighed sample of about 15.0 g of the resultant graft copolymer emulsion precipitated the copolymer, after which the copolymer was vacuum dried at 50° C. in a vacuum oven. The yield of copolymer powder was about 3.2 g, the solid content of the emulsion is 21.3%, the conversion of acrylamide is about 98%. The intrinsic viscosity is 8.2, the molecular weight is $3.82 \times 10^6$.

EXAMPLE 15

This example illustrates the preparation of the emulsion of starch-AM-NH$_4$-AMPS graft copolymer. The process follows the procedure of Example 14, excepting that in the solution of polymeric backbone was dissolved 6.0 g water-soluble starch instead of that solution of CMC used in Example 14. The solid content of the emulsion is 20.5% the conversion of acrylamide was about 98%. The intrinsic viscosity is 7.6, the molecular weight is $3.40 \times 10^6$.

EXAMPLE 16

This example illustrates the preparation of the emulsion of dextran-acrylamide-ammonium AMPS graft copolymer. The process follows the procedure of Example 14, excepting that in the solution of polymeric backbone was dissolved 6.0 g of industrial grade dextran with 5,000,000–40,000,000 average Mol. Wt. instead of that solution of CMC used in EXAMPLE 14. The solid content of the emulsion is 20.5% the conversion of acrylamide is about 98%. The intrinsic viscosity is 7.6, the molecular weight is $3.40 \times 10^6$.

I claim:

1. A process of making a water soluble graft copolymer by grafting water soluble ethylenically unsaturated monomeric material on to a water soluble substrate having hydroxyl groups while the monomeric material and substrate are present as an aqueous solution emulsified into a water immiscible liquid and in the presence of a free radial initiator system, wherein the free radical initiator system comprises a combination of an oxidising metal capable of being reduced by the substrate to a lower valency state and a peroxy compound capable of oxidising the metal in the reduced valency state to a higher valency state, whereby the molecular weight of the graft copolymer is above 1 million.

2. A process according to claim 1 in which the hydroxyl groups on the substrate are vic-glycol groups.

3. A process according to claim 1 in which the substrate is a hydroxy-substituted polymer.

4. A process according to claim 1 in which the metal is selected from chromium, vanadium, titanium, manganese or cerium.

5. A process according to claim 1 in which the metal is cerium and the peroxy compound is persulphate.

6. A process according to claim 1 in which the substrate is carboxymethyl cellulose the monomer comprises ethylenically unsaturated carboxylic acid.

7. A process according to claim 1 in which the aqueous solution contains from 2 to 10% by weight of a polymeric vic glycol and 90 to 98% ethylenically unsaturated monomers comprising acrylamide and anionic monomer in the ratio 40:60 to 80:20 by weight.

8. A process according to claim 1 in which the aqueous solution contains 2 to 10% by weight substrate selected from carboxymethyl cellulose, dextran and starch, 48 to 75% by weight acrylamide and 15 to 50% by weight of at least one of acrylic acid and 2-acrylamido methyl propane sulphonic acid.

9. A reserve phase emulsion comprising a dispersion in water immiscible liquid of water soluble polymer particles having an intrinsic viscosity of at least 7.6 dl/g made by reverse phase polymerisation in that liquid, in which the polymer is a graft copolymer of 2 to 10% by weight of a substrate selected from carboxymethyl cellulose, dextran and starch, 48 to 75% by weight acrylamide, and 15 to 50% by weight of at least one of acrylic acid and 2-acrylamido methyl propane sulphonate.

10. A process according to claim 1 in which the graft polymer had intrinsic viscosity of at least 7.6 dl/g.

11. A process of making a water soluble graft copolymer having a molecular weight of above 1 million by grafting water soluble ethylenically unsaturated monomeric material comprising acrylamide and anionic monomer onto a water soluble substrate selected from carboxymethyl cellulose, dextran and starch while the monomeric material and substrate are present as an aqueous solution emulsified into a water immiscible liquid and in the presence of free radical initiator system comprising cerium (4+) and persulphate.

12. A process according to claim 11 in which the graft polymer has intrinsic viscosity at least 7.6 dl/g.

13. A process according to claim 11 in which the aqueous solution contains 2 to 10% by weight substrate selected from carboxymethyl cellulose, dextran and starch, 48 to 75% by weight acrylamide and 15 to 50% by weight of at least one of acrylic acid and 2-acrylamido methyl propane sulphonic acid.

14. A process according to claim 11 in which the water soluble substrate is carboxymethyl cellulose.

* * * * *